United States Patent
Shin et al.

(10) Patent No.: US 7,030,419 B2
(45) Date of Patent: Apr. 18, 2006

(54) THIN FILM FOR OPTICAL APPLICATIONS, LIGHT-EMITTING STRUCTURE USING THE SAME AND THE FABRICATION METHOD THEREOF

(75) Inventors: Jung-Hoon Shin, Daejon (KR); Se-Young Seo, Daejon (KR); Hak-Seung Han, Daejon (KR)

(73) Assignee: Luxpert Technologies Co., Ltd., Seoul (KR)

( * ) Notice: Subject to any disclaimer, the term of this patent is extended or adjusted under 35 U.S.C. 154(b) by 39 days.

(21) Appl. No.: 10/503,016

(22) PCT Filed: Jan. 29, 2003

(86) PCT No.: PCT/KR03/00206

§ 371 (c)(1),
(2), (4) Date: Jul. 28, 2004

(87) PCT Pub. No.: WO03/065092

PCT Pub. Date: Aug. 7, 2003

(65) Prior Publication Data

US 2005/0077526 A1   Apr. 14, 2005

(30) Foreign Application Priority Data

Jan. 29, 2002   (KR) ............... 10-2002-0005140

(51) Int. Cl.
*H01L 33/00* (2006.01)
*H01L 21/20* (2006.01)

(52) U.S. Cl. ............... 257/87; 257/101; 257/103; 438/45; 438/502; 438/509

(58) Field of Classification Search .............. 257/87
See application file for complete search history.

(56) References Cited

U.S. PATENT DOCUMENTS

| | | | |
|---|---|---|---|
| 2004/0106285 A1 * | 6/2004 | Zacharias | 438/689 |
| 2004/0183087 A1 * | 9/2004 | Gardner | 257/102 |
| 2004/0214362 A1 * | 10/2004 | Hill et al. | 438/33 |
| 2004/0252738 A1 * | 12/2004 | Hill | 372/43 |

FOREIGN PATENT DOCUMENTS

EP    1 000 949 A1    5/2000

* cited by examiner

*Primary Examiner*—Stephen W. Smoot
(74) *Attorney, Agent, or Firm*—Marger Johnson & McCollom, P.C.

(57) ABSTRACT

Thin film for optical applications, light-emitting structure using the same and the fabrication method thereof are disclosed. The present invention provides a silica or silica-related thin film for optical applications in which silicon nanoclusters and rare earth elements are co-doped. The average size of the silicon nanoclusters is less than 3 nm and the concentration of the rare earth elements is less than 0.1 atomic %. The ratio of the rare earth element concentration to that of silicon nanoclusters is controlled to range from 1 to 10 in the thin film. The thin film emits light by exciting the rare earth elements through electron-hole recombinations in the silicon nanoclusters. According to the present invention, the conditions such as the size and concentration of the silicon nanoclusters, the concentration of the rare earth element, and their concentration ratio are specifically optimized to fabricate optical devices with better performance.

14 Claims, 4 Drawing Sheets

THIN FILM FOR OPTICAL APPLICATIONS, LIGHT-EMITTING STRUCTURE USING THE SAME AND THE FABRICATION METHOD THEREOF

TECHNICAL FIELD

The present invention relates to a silica or silica-based thin film and a method for manufacturing the same, and more particularly to a silica or silica-based thin films which are co-doped with rare earth atoms and silicon nanoclusters, as well as a method for manufacturing the same. Therefore, the excitation efficiency of the rare earth atoms is improved, resulting in efficient application of the thin film for optical devices.

BACKGROUND ART

Recently, a silica or silica-based thin film that is doped with rare earth atoms has widely been used to manufacture a waveguide amplifier. However, it is essentially similar to a silica or silica-based optical fiber that is doped with rare earth atoms. Furthermore, because the excitation cross section of the rare earth atoms is very low, on the level of $4 \times 10{-21}$ cm$^2$, a high-priced laser for exciting the rare earth element and a WDM structure for dividing a signal light and a pump light are required. Such a waveguide amplifier is no different from an optical amplifier based on an optical fibers. In particular, it is does not offer significant advantages in terms of cost, performance and potential for future development over optical amplifiers based on optical fibers.

Meanwhile, in case of doping rare earth atoms into a semiconductor thin film, the excitation efficiency of the rare earth atoms is greatly increased. This is because carrier recombination gives rise to excitation of the rare earth element in the semiconductor thin film. This excitation mechanism can be schematically expressed in FIG. 1.

FIG. 1 is a schematic view showing excitation and back-excitation of a rare earth element through electron-hole combination. In FIG. 1, a solid line arrow represents an excitation process and a dotted line arrow represents a back-excitation process.

Referring to FIG. 1, when a rare earth-doped semiconductor material is exposed to light, carriers are generated. The carriers are captured into a trap state of the rare earth atom and form electron-hole pairs. Energy generated by recombination of the electron-hole pairs gives rise to excitation of the rare earth atoms through Auger excitation. In this case, there is no particular limitation to the light source for generating carriers as long as the light from the light source is absorbed in the semiconductor. Therefore, there is no need to use a high-priced laser, which has been conventionally used for exciting a rare earth element. In addition, an effective excitation cross section of such an excitation process is $3 \times 10^{-15}$ cm$^2$, which is approximately one million times higher than an optical absorption cross section of $8 \times 10^{-21}$ cm$^2$. Therefore, more efficient excitation is expected.

However, because all physical phenomena are reversible, back-excitation for reversing the aforementioned excitation can also occur. That is, the "backtransfer" process, "impurity-Auger" process and "exciton-Auger" processes may occur. The excited rare earth atoms form electron-hole pairs instead of emitting light through the back-transfer process, the excited rare earth atoms excite the generated carriers instead of emitting light through the impurity-Auger process, and the generated electron-hole pairs excite the generated carriers instead of exciting the rare earth elements through the exciton-Auger process. For this reason, a conventional rare earth-doped semiconductor has the very low luminous efficiency.

In summary, the silica-based thin film has the high luminous efficiency but the very low excitation efficiency, while the semiconductor thin film has the high excitation efficiency but the very low luminous efficiency. In order to overcome these problems, a method for co-doping silicon nanoclusters and rare earth atoms in a silica/silica-based thin film has been suggested and studied for several years. In this case, the rare earth element provides the high luminous efficiency in the silica thin film. At the same time, because the rare earth element is separated from the silicon nanoclusters by a distance of only several nm, electron-hole combinations formed in the silicon nanoclusters provide the high excitation efficiency. This model is schematically represented in FIG. 2. In FIG. 2, it can be seen that silicon nanoclusters 210 and rare earth atoms 220 are distributed in the silica-based thin film 200 in a state wherein the thin film are co-doped with the silicon nanoclusters and rare earth atoms. However, this model is only conceptual and has not been practically applied. In order for this model to be practically applied, the size and concentration of the silicon nanocluster and the concentration of the rare earth element, must be specifically optimized.

DISCLOSURE OF THE INVENTION

Therefore, the present invention has been made in view of the above problems, and it is an object of the present invention to provide a thin film for optical devices and a light-emitting structure using the same, having the size and concentration of the silicon nanoclusters and concentration of the rare earth atoms suitable for practical application. It is another object of the present invention to provide a method for manufacturing such a thin film.

In accordance with one aspect of the present invention, the above and other objects can be accomplished by the provision of a silica or silica-based thin film for optical devices, which is co-doped with silicon nanoclusters and rare earth atoms, characterized in that the average size of the silicon nanocluster is 3 nm or less; the concentration of the rare earth atoms is 0.1 atomic % or less; and the concentration ratio of the rare earth atoms to the silicon nanocluster is 1 to 10, the thin film emitting light by exciting the rare earth atoms through electron-hole combinations formed in the silicon nanocluster.

Preferably, the thin film is co-doped with the silicon nanoclusters and rare earth atoms in a state wherein the refractive index of the thin film is spatially non-uniform.

Preferably, the thin film is doped with the rare earth element in a state wherein the rare earth element is not uniformly distributed in the thin film.

Preferably, the concentration of the rare earth element is controlled to match an optical mode.

With respect to doping of the rare earth atoms, at least two elements of rare earth atoms may be doped. In this case, individual types of rare earth elements are alternately doped on respective silica layers. Such alternate doping layers may be repeatedly formed. It is preferable to limit the thickness of each layer to 10 nm or less.

Meanwhile, a non-doped silica or silica-based layer may be formed between rare earth-doped layers in order to prevent the interaction between the rare earth elements. It is preferable to limit the thickness of the non-doped silica or silica-based layer to 10 nm or less.

In accordance with another aspect of the present invention, there is provided a light-emitting structure, comprising a substrate selected from the group consisting of an oxidized silicon substrate, a silica substrate and a silica-based substrate; a light-emitting thin film for optical devices, which is formed with the aforementioned structure on the substrate; and a silica or silica-based upper cladding layer formed on the thin film.

In accordance with another aspect of the present invention, there is provided a method for manufacturing the thin film for optical devices, comprising the steps of vapor depositing the thin film using a plasma CVD method at a low pressure of $1\times10^{-3}$ Torr or less and a high density of $10^{10}$ to $10^{13}$ ions/cm$^3$ and heating the deposited thin film at a temperature of 1,100° or less.

Preferably, the heating step is carried out at a temperature range of 900° C. to 1,100° C. for 5 minutes or more.

In accordance with another aspect of the present invention, there is provided a method for manufacturing the thin film for optical devices, comprising the steps of generating silicon nanoclusters; diluting a rare earth-doped silica or silica-based sol-gel with the silicon nanoclusters; and drying and heating the diluted resultant.

In accordance with yet another aspect of the present invention, there is provided a method for manufacturing the thin film for optical devices, comprising the steps of generating silicon nanoclusters; doping rare earth atoms into the silicon nanoclusters; diluting a silica or silica-based sol-gel with the doped resultant; and drying and heating the diluted resultant.

In case of co-doping the rare earth atoms and silicon nanoclusters, it is important to generate the silicon nanoclusters while maintaining the optical activity of the rare earth element. For this, the rare earth-doped thin film is heated at a temperature of 1,100° C. or less.

Therefore, a new thin film structure for practical application can be accomplished, which has the high luminous efficiency of the rare earth element similar to the silica-based thin film as well as the high excitation cross section of the rare earth element similar to the semiconductor thin film.

BRIEF DESCRIPTION OF THE DRAWINGS

The above and other objectives, features and other advantages of the present invention will be more clearly understood from the following detailed description taken in conjunction with the accompanying drawings, in which:

FIG. 7b is a schematic cross sectional view showing a thin film for optical devices, in which a non-doped layer is inserted between the rare earth-doped layers of FIG. 7a.

BEST MODE FOR CARRYING OUT THE INVENTION

Hereinafter, the embodiments of the present invention will be described in more detail with reference to the accompanying drawings. The device structure according to the present invention and its manufacturing method will be further described.

First Embodiment

Figure 1:
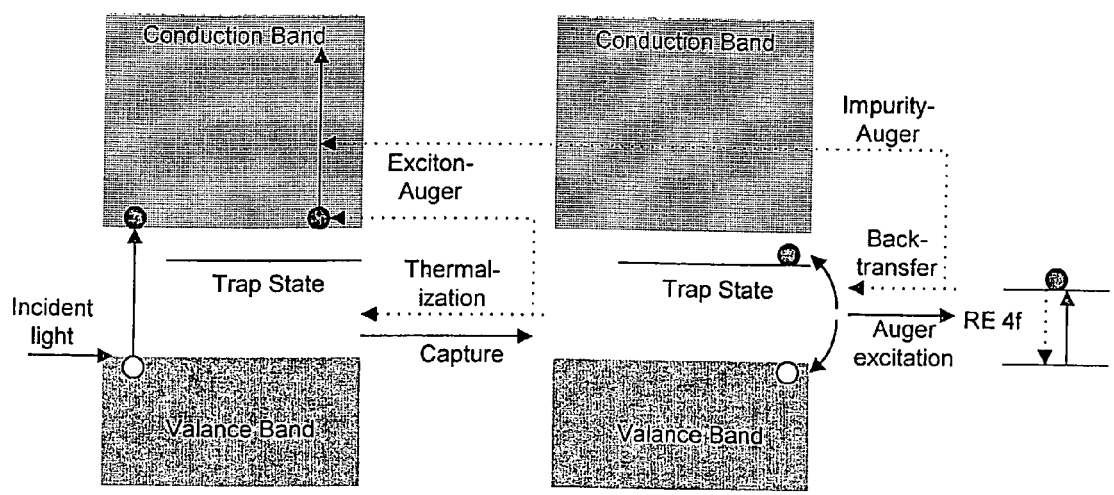
FIG. 1 is a schematic view showing excitation and back-excitation of a rare earth atom through electron-hole combination.
Figure 2:
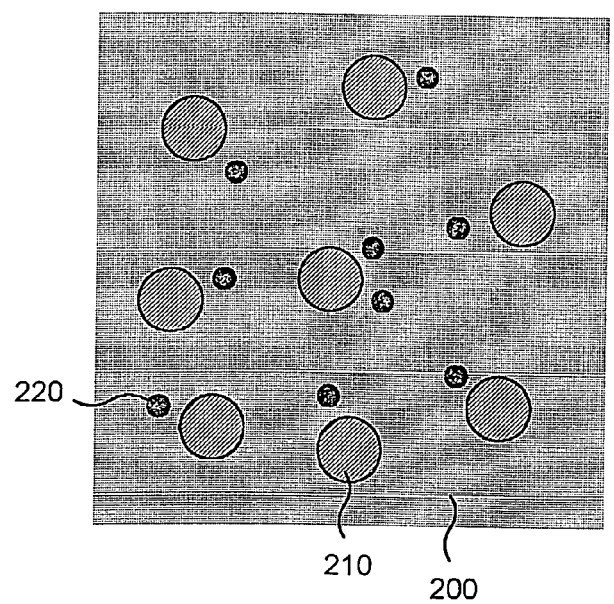
FIG. 2 is a schematic view showing a silica or silica-based thin film co-doped with ilicon nanoclusters and rare earth atoms.
Figure 3:
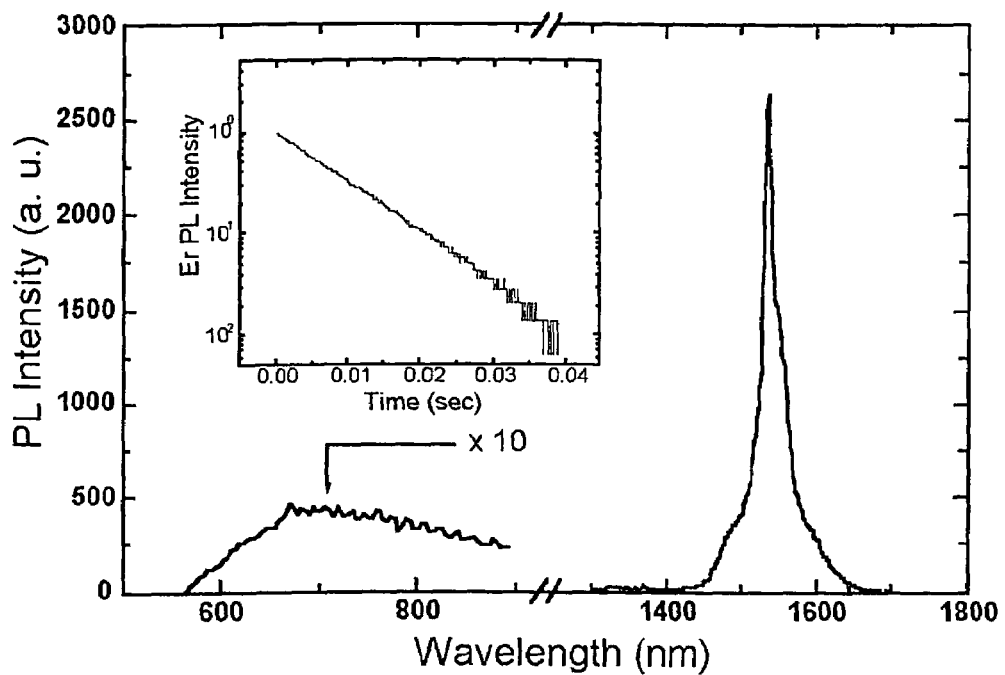
FIG. 3 is a graph showing the photoluminescence spectrum of a silica thin film for optical devices at room temperature according to the first embodiment of the present invention.

FIG. 3 is a graph showing the photoluminescence spectrum of a silica thin film for optical devices at room temperature according to the first embodiment of the present invention. The thin film comprising 35 atomic % of silicon, 65 atomic % of oxygen and 0.04 atomic % of erbium was chemical vapor deposited and heated at 1,000° C. for 5 minutes. As shown in FIG. 3, a luminescence peak of a silicon nanocluster was observed around 700 nm. The relationship between the position of the luminescence peak of the silicon nanocluster and the size of the silicon nanocluster is already known in the art. Based on this result, the average size of the silicon nanocluster in the thin film was calculated as 2 nm. In this case, the concentration of the silicon nanocluster was $7\times10^{18}$ cm$^{-3}$ and the concentration ratio of the doped erbium to the silicon nanocluster was 3. That is, it can be said that the thin film of FIG. 3 is manufactured according to the method of the present invention.

According to the first embodiment of the present invention, the average size of the silicon nanocluster was 2 nm, the concentration of the rare earth element was 0.04 atomic % and the concentration ratio of the erbium to the silicon nanocluster was 3. However, the present invention is not limited to these values. They may be selected from the ranges of 3 nm or less, less than 0.1 atomic %, and 1 to 10, respectively.

The reason why the size and concentration of the silicon nanocluster, the concentration of the rare earth element, and the concentration ratio of the rare earth element to the silicon nanocluster are limited to the aforementioned ranges is as the following.

First, in order to prevent backtransfer, it is required that the trap state energy is higher than the transition energy of the rare earth element. For this, the band gap of the silicon nanocluster must be sufficiently large. Considering that the transition energy of erbium is 0.8 eV, the transition energy of Nd is 1.36 eV and the energy of room temperature is 0.03 eV, the band gap must be at least 1.6 eV. In this regard, it is necessary to limit the size of the silicon nanocluster to 3 nm or less.

Second, the present inventor found that the silicon nanocluster must be separated from the rare earth element by a distance of 2 nm or less in order to excite the rare earth element. Therefore, the rare earth atoms must be doped in a manner such that it is positioned within 2 nm from the silicon nanocluster with a size of 3 nm or less. This means that one rare earth atom is present in the volume of (5 nm)$^3$. That is, a rare earth atom concentration of $1\times10^{19}$ cm$^{-3}$ is required. Therefore, it is necessary to limit the relative concentration of the rare earth atoms to 0.1 atomic %, considering the density of the silica thin film.

Third, it was reported that strong interaction between the silicon nanocluster and the rare earth atoms prevents one silicon nanocluster from exciting a large number of the rare earth elements. In this regard, the number of the rare earth elements must be controlled in order for the silicon nanocluster to efficiently excite the rare earth atoms. Although there have been no reports about the number of the rare earth elements, it was reported that the excitation rate of the silicon nanocluster is 10 to 100 μs and the luminescence decay rate of the rare earth elements is 1 ms. It can be seen from the reports that the concentration ratio of the rare earth element to the silicon nanocluster does not exceed 10.

Turning to FIG. 3, the luminescence peak of erbium was also observed around 1.5 μm. As shown in inset of FIG. 3, the lifetime of this luminescence is long, on the level of 8 msec or more. Due to such a long luminescence lifetime, the silica thin film structure for optical devices according to the first embodiment of the present invention can be usefully applied for optical amplification.

Figure 4:
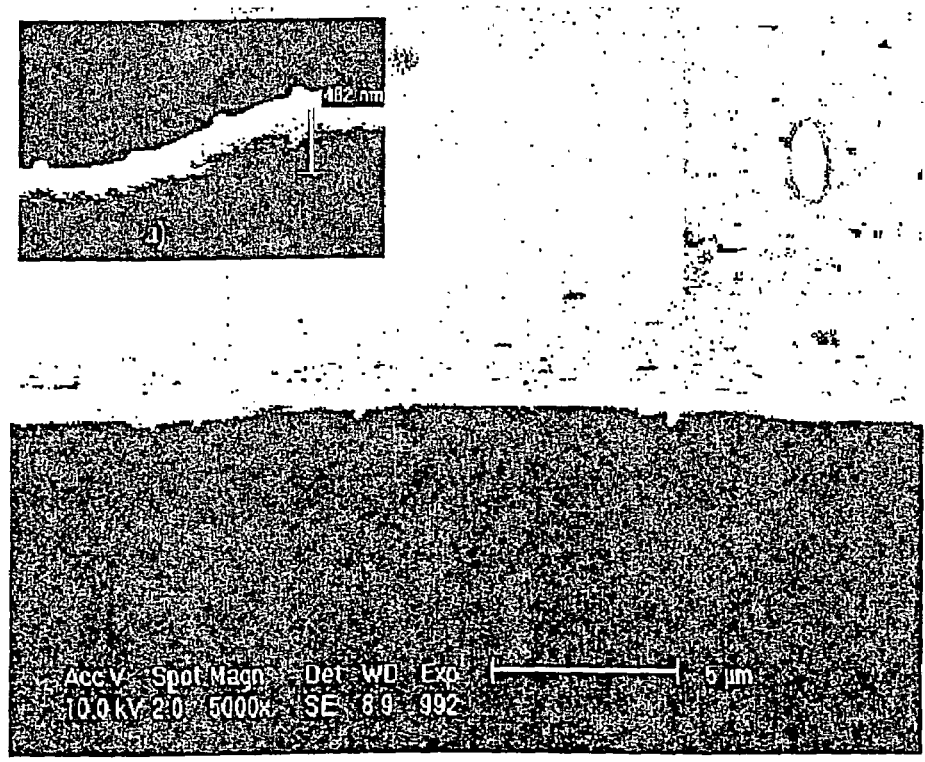
FIG. 4 is an electron micrograph of a waveguide manufactured using the thin film as shown in FIG. 3.

FIG. 4 is an electron micrograph of a waveguide manufactured using the thin film as shown in FIG. 3. In FIG. 4, a) shows an enlarged photograph of the side wall of the waveguide and b) shows a camera image of an infrared signal which passed through the waveguide. It can be seen from FIG. 4 that the waveguide is a single mode waveguide with a smooth side wall.

Figure 5:
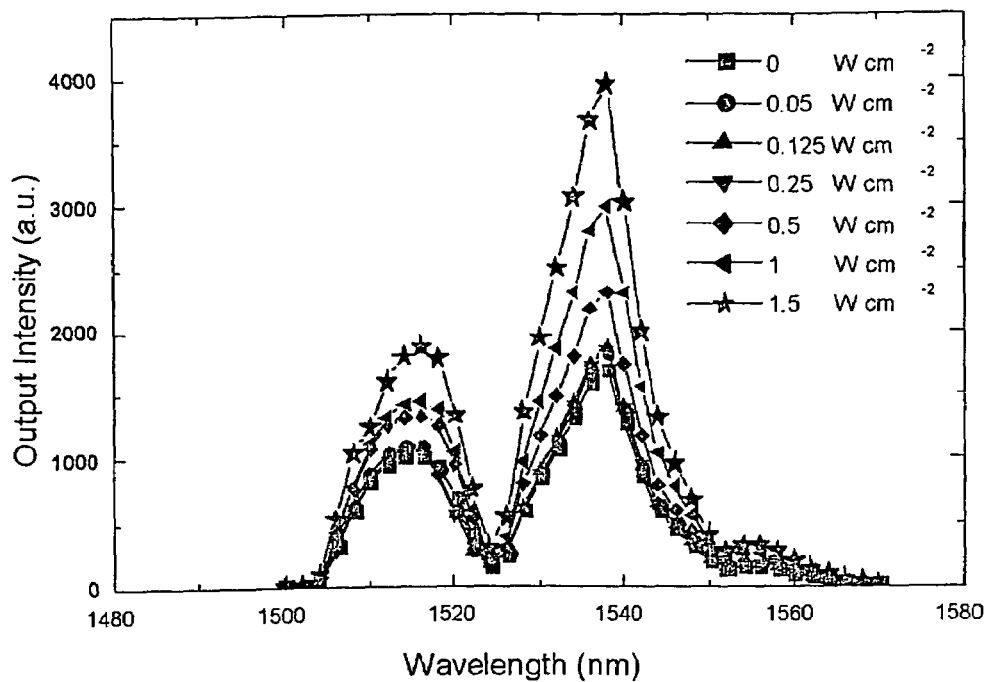
FIG. 5 is a graph showing intensities of output light signals in the waveguide as shown in FIG. 4.

FIG. 5 is a graph showing intensities of output light signals in the waveguide as shown in FIG. 4. The graph curves represent the spectra of output light signals after inputting light signals into the waveguide and pumping the waveguide using a pump light. Referring to FIG. 5, it can be seen that input light signals are amplified at a pump power of more than 0.5 W/cm$^2$.

In case of manufacturing the silica or silica-based thin film that is co-doped with the silicon nanocluster and the rare earth element, it is important to generate the silicon nanocluster while maintaining the optical activity of the rare earth element. For this reason, it is necessary to limit the heating temperature of the thin film to 1,100° C. or less. For this, the thin film can be manufactured according to any following methods:

1) A method comprising vapor depositing a silicon-rich silica thin film doped with a rare earth element of 0.1 atomic % on a silica substrate and heating the deposited thin film at less than 1,100° C. to precipitate the silicon nanoclusters;
2) A method comprising generating silicon nanoclusters and diluting a rare earth-doped sol-gel silica precursor with the silicon nanoclusters; and
3) A method comprising generating silicon nanoclusters, doping the silicon nanoclusters with rare earth atoms, and diluting a sol-gel silica precursor with the rare earth-doped silicon nanocluster.

In the method 1), any vapor deposition method can be used. It is preferable to use a PECVD method at a low pressure and a high density plasma. Preferably, the pressure is $1\times10^{-3}$ Torr or less and the plasma density is $10^{10}$ to $10^{13}$ ions/cm$^3$. Therefore, a silicon nanocluster precursor is generated in the silicon-rich silica thin film to be deposited using the plasma, giving rise to easy generation of the silicon nanocluster with a size of 3 nm or less.

Second Embodiment

Figure 6:
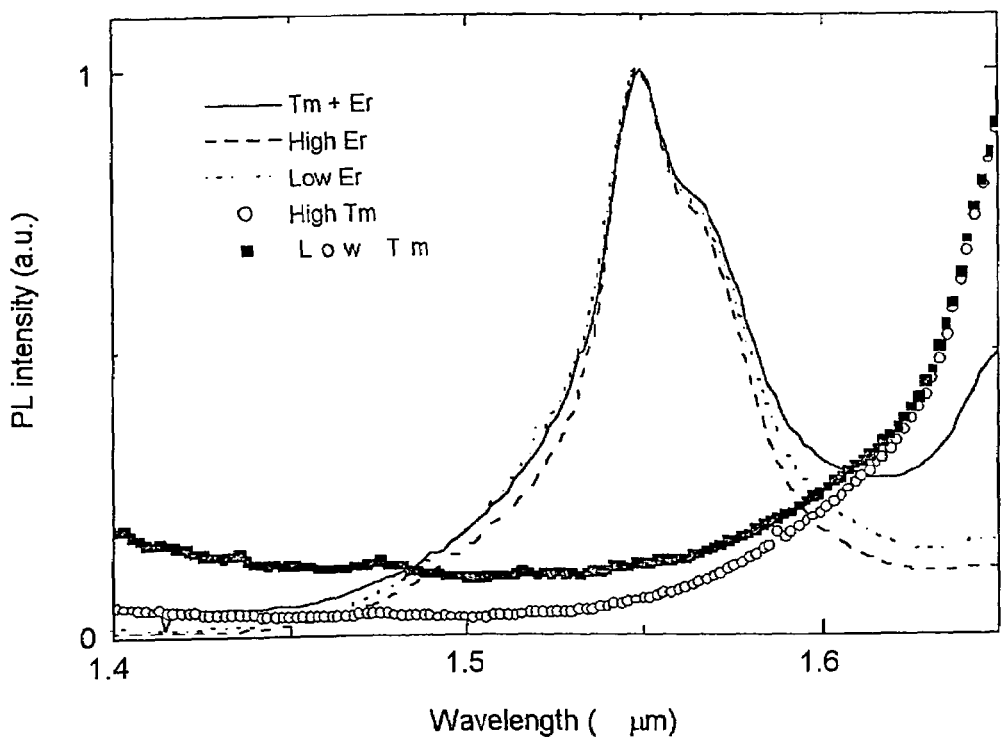
FIG. 6 is a graph showing the photoluminescence spectra of silica thin films for optical devices doped with erbium, thulium and silicon nanocluster in combination according to the second embodiment of the present invention.

In case of a silica or silica-based thin film which is co-doped with a silicon nanocluster and rare earth atoms, the rare earth atoms are excited through an electron-hole recombination formed in the silicon nanocluster regardless of the absorption band of the rare earth element. In this regard, in accordance with the second embodiment of the present invention, in case of doping various types of the rare earth elements on one thin film, it is possible to generate luminescence of various wavebands using one pump light source. FIG. 6 shows the photoluminescence spectra of silica thin films for optical devices doped with erbium and/or thulium. A pump light source of 488 nm wavelength was used alone. In FIG. 6, a solid line represents the thin film which is co-doped with erbium and thulium, a long dotted line represents the thin film which is doped with a high concentration of erbium, a short dotted line represents the thin film which is doped with a low concentration of erbium, a circle represents the thin film which is doped with a high concentration of thulium, and a square represents the thin film which is doped with a low concentration of thulium. It can be seen from FIG. 6 that in spite of using one pump light source, simultaneous luminescence of two rare earth elements, erbium and thulium results in wider luminescence area, compared with luminescence of either erbium or thulium.

Third Embodiment

Figure 7A:
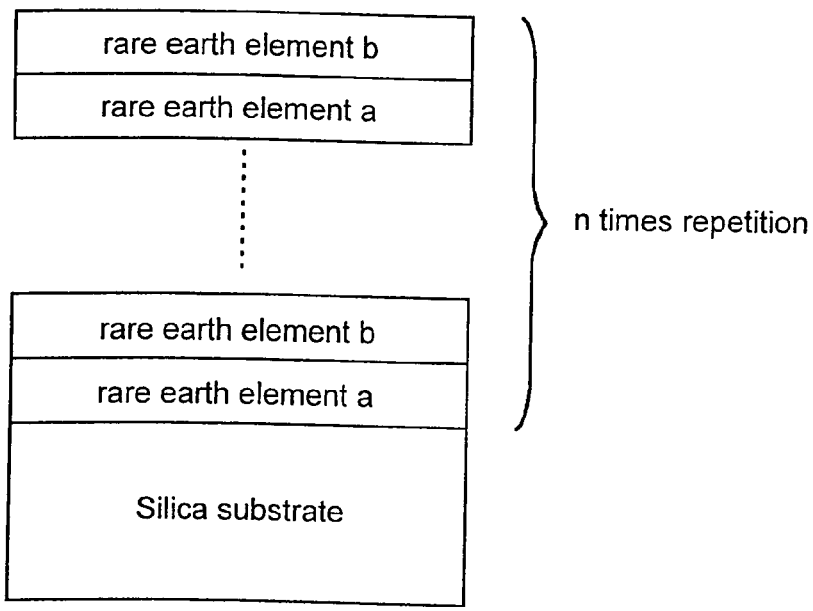
FIG. 7a is a schematic cross sectional view showing a thin film for optical devices alternately doped with at least two types of rare earth elements.
Figure 7B:
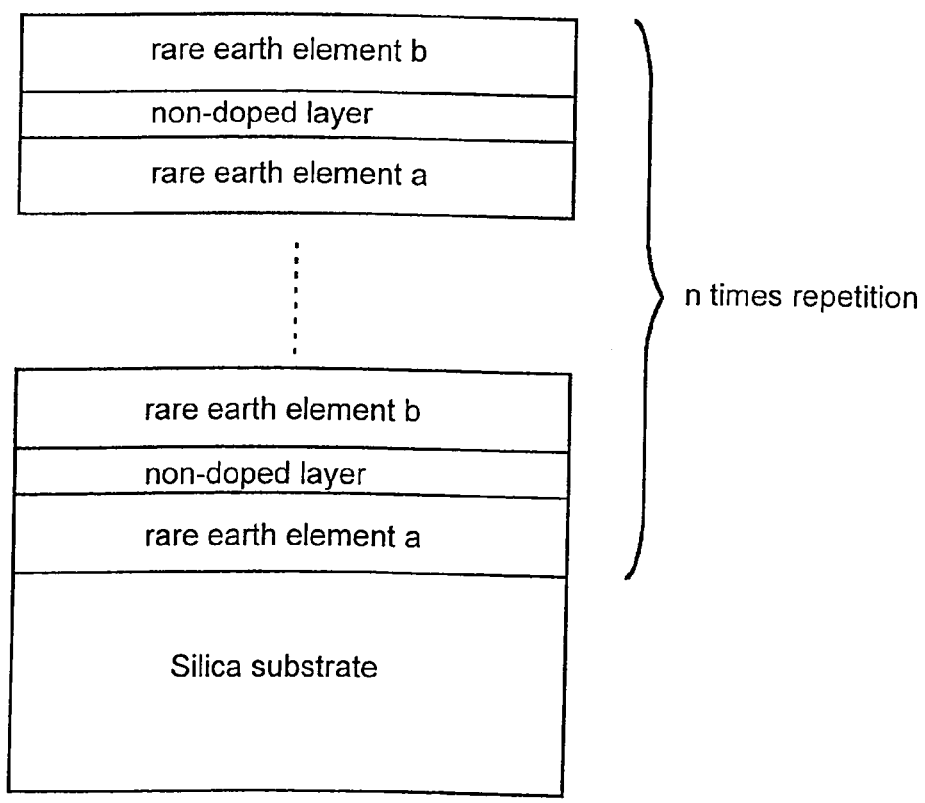

In case of using two types of rare earth elements according to the second embodiment of the present invention, these rare earth elements may interact with each other, thereby lowering the luminous efficiency. In order to solve this problem, it is necessary to dope the two types of rare earth elements on multiple silica layers in a manner such that one silica layer is doped with one type of a rare earth element (see FIG. 7a). Preferably, as shown in FIG. 7b, a non-doped silica layer can be sandwiched between the two types of rare earth elements. As a result, the two types of rare earth elements can be entirely prevented from interacting with each other. In this case, it is preferable to limit the thickness of each layer to 10 nm or less to ensure total uniformity of the thin film. FIGS. 7a and 7b are schematic cross sectional views showing the aforementioned thin film structures. It is understood that doping with two or more types of rare earth elements belongs to the third embodiment of the present invention.

INDUSTRIAL APPLICABILITY

As apparent from the above description, according to the present invention, the silicon nanoclusters excite the rare earth atoms doped therewith. As a result, similar to the silica- and semiconductor-thin film, the high luminous efficiency and the high excitation efficiency can be obtained. In particular, because the total luminous efficiency of the thin film is high enough to be applied for optical devices, there is no need to use a high-priced pump laser. This enables integration of optical devices as well as lowering unit cost of the optical device. As a result, remarkable development is accomplished in the field of optical devices.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A silica or silica-based thin film for optical devices, which is co-doped with silicon nanoclusters and rare earth atoms, characterized in that the average size of the silicon nanocluster is 3 nm or less; the concentration of the rare earth atoms is 0.1 atomic % or less; and the concentration ratio of the rare earth atoms to the silicon nanocluster is 1 to 10, the thin film emitting light by exciting the rare earth element through an electron-hole combination formed in the silicon nanocluster.

2. The thin film as set forth in claim 1, wherein the thin film is co-doped with the silicon nanocluster and rare earth element in a state wherein the refractive index of the thin film is spatially non-uniform.

3. The thin film as set forth in claim 1, wherein the thin film is doped with the rare earth element in a state wherein the rare earth element is not uniformly distributed in the thin film.

4. The thin film as set forth in claim 3, wherein the concentration of the rare earth element is controlled to match an optical mode.

5. The thin film as set forth in claim 1, which is doped with at least two types of the rare earth elements.

6. The thin film as set forth in claim 5, wherein at least two types of the rare earth elements are alternately doped on respective layers and the alternate doping layers are repeatedly formed.

7. The thin film as set forth in claim 6, wherein the thickness of each layer is 10 nm or less.

8. The thin film as set forth in claim 7, wherein a non-doped silica or silica-based layer is formed between the rare earth-doped layers in order to prevent the interaction between the rare earth elements.

9. The thin film as set forth in claim 8, wherein the thickness of the non-doped silica or silica-based layer is 10 nm or less.

10. A light-emitting structure, comprising:
a substrate selected from the group consisting of an oxidized silicon substrate, a silica substrate and a silica-based substrate;
a light-emitting thin film for optical devices, which is formed with the structure as set forth in claim 1 on the substrate; and
a silica or silica-based upper cladding layer formed on the thin film.

11. A method for manufacturing the thin film for optical devices as set forth in claim 10, comprising the steps of:
vapor depositing the thin film using a plasma CVD method at a low pressure of $1 \times 10^{-3}$ Torr or less and a high density of $10^{10}$ to $10^{13}$ ions/cm$^3$; and
heating the deposited thin film at a temperature of 1,100° C. or less.

12. The method as set forth in claim 11, wherein the heating step is carried out at a temperature range of 900° C. to 1,100° C. for 5 minutes or more.

13. A method for manufacturing the thin film for optical devices as set forth in claim 10, comprising the steps of:
generating a silicon nanocluster;
diluting a rare earth-doped silica or silica-based sol-gel with the silicon nanocluster; and
drying and heating the diluted resultant.

14. A method for manufacturing the thin film for optical devices as set forth in claim 10, comprising the steps of:
generating a silicon nanocluster;
doping a rare earth element on the silicon nanocluster;
diluting a silica or silica-based sol-gel with the doped resultant; and
drying and heating the diluted resultant.

* * * * *